United States Patent [19]

Shin

[11] Patent Number: 4,988,056
[45] Date of Patent: Jan. 29, 1991

[54] REEL MOTOR BRAKING APPARATUS FOR VIDEO CASSETTE TAPE RECORDER

[75] Inventor: Jae H. Shin, Seoul, Rep. of Korea

[73] Assignee: Gold Star Co., Ltd., Seoul, Rep. of Korea

[21] Appl. No.: 946,029

[22] Filed: Dec. 24, 1986

[30] Foreign Application Priority Data

Dec. 27, 1985 [KR] Rep. of Korea ............... 17711/1985

[51] Int. Cl.$^5$ ...................... B65H 59/38; G11B 15/32
[52] U.S. Cl. ...................................... 242/191; 242/57; 242/203; 242/204; 318/6; 360/74.2
[58] Field of Search ................ 242/57, 186, 191, 203, 242/204; 318/6, 7, 375; 360/74.2

[56] References Cited

U.S. PATENT DOCUMENTS

| | | | |
|---|---|---|---|
| 2,535,486 | 12/1950 | Dank | 242/204 X |
| 3,809,329 | 5/1974 | Jenkins | 242/186 X |
| 3,834,648 | 9/1974 | Rose et al. | 242/186 |
| 4,090,679 | 5/1978 | Hayashi | 242/191 X |
| 4,114,830 | 9/1978 | Hoshi et al. | 242/191 |
| 4,398,227 | 8/1983 | Anderson | 360/74.2 X |
| 4,528,604 | 7/1985 | Koyama | 360/74.2 |

Primary Examiner—Joseph J. Hail, III
Attorney, Agent, or Firm—Birch, Stewart, Kolasch & Birch

[57] ABSTRACT

A reel motor braking apparatus for a video cassette tape recorder which can perform the braking of a supply reel and take-up reel speedily even if the termination of a tape has failed to be detected due to a failure of a termination sensor or a poor quality of tape. In the apparatus a control signal is applied to the control terminals (SC,TC) of a supply reel motor and take up reel motor at the time of completing a Fast-forward or rewind operation that is inverted by the hardware.

3 Claims, 1 Drawing Sheet

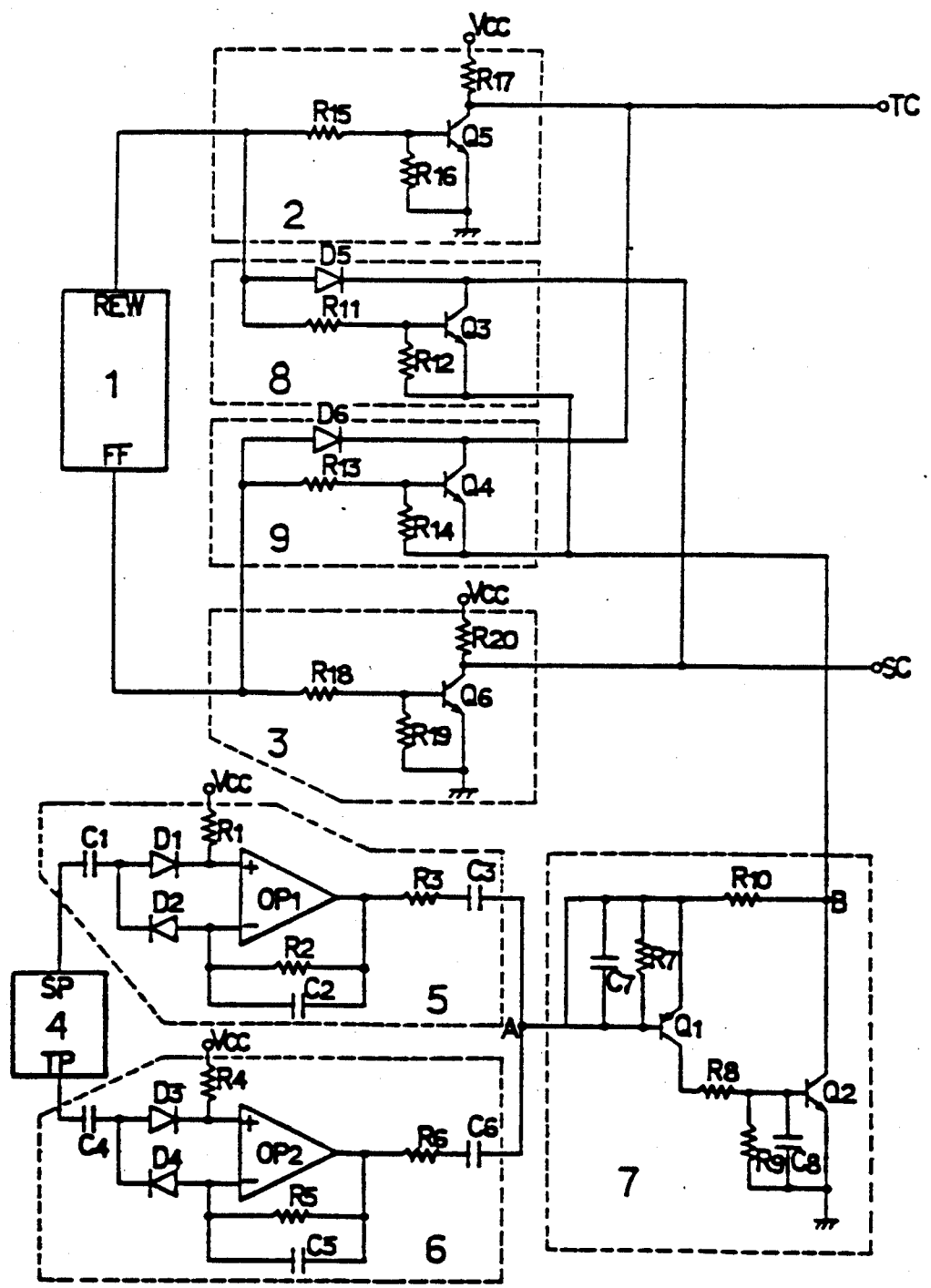

REEL MOTOR BRAKING APPARATUS FOR VIDEO CASSETTE TAPE RECORDER

BACKGROUND OF THE INVENTION

1. Field of the Invention

This invention relates to a reel motor braking apparatus for a video cassette tape recorder (VCR) in a direct drive mode, and more particularly to a reel motor braking apparatus wherein a reverse direction control signal is applied to each control terminal of a supply reel motor and a take-up reel motor at the completion of a fast-forward (FF) operation and a Rewind (REW) operation, thereby rapidly performing the braking of the reel motor.

2. Description of the Prior Art

The conventional video cassette tape recorder has performed the braking of a reel motor by forming the blank portion or the portion without any magnetic material at the end of the tape as a magnetic recording medium in order to detect the termination of the tape by means of a photo sensor or hall sensor and by utilizing the resultant tape termination detecting signal. However, the apparatus was unable to detect the termination of a tape accurately, as in the case of using a tape which has been spliced, or the failure of the termination sensor or the poor quality of a used tape. Also, in the fast-forward and rewind operations, much higher voltage than that in the playing operation is applied to the take up reel motor in order or the supply reel motor to rotate the reel at a high speed, for completing the fast-forward operation and rewind operation, so that a great torque occurs in the take-up reel or the supply reel. Accordingly, the apparatus has a drawback in that breakage of the tape and reel would result, in case the termination of the tape failed to be detected due to the failure of the termination sensor or the poor quality of tape as described above.

OBJECT OF THE INVENTION

Accordingly, it is an object of the present invention to provide a reel motor braking apparatus wherein in case the termination of the tape fails to be detected due to a failure of a termination sensor or a poor quality of tape, a control signal applied to the control terminal of the supply reel motor and the take up reel motor at the time of completing the fast-forward and rewind operation is inverted by the hardware, thereby immediately performing the braking of the supply reel and take-up reel.

SUMMARY OF THE INVENTION

In order to attain the purpose of this invention, the present apparatus comprises means for converting two reel pulse signals generated according to the rotation of a supply reel and a take-up reel to two voltages at two frequency-to-voltage converters, respectively; means for determining the stop state of a reel, if high level voltages are provided at said two frequency to voltage converters; and means for utilizing the reel-stop determining signal to apply a backward direction control signal opposite to the direction of current of the control signal to the control terminals of said supply reel and take-up reel.

BRIEF DESCRIPTION OF THE DRAWING

These objects and features of this invention will become more apparent from the following explanation with reference to the accompanying drawing wherein:

the single drawing is a detailed circuit diagram of the reel motor braking apparatus according to the present invention.

DETAILED DESCRIPTION OF THE INVENTION

The single drawing shows a detailed circuit of one embodiment of the reel motor braking apparatus according to the present invention, in which a rewind control signal output terminal REW, a Fast-forward control signal output terminal FF of a microprocessor 1 are connected via inversion amplifying circuits 2 and 3 to a take-up reel motor control terminal TC and a supply reel motor control terminal SC. Further, in the apparatus as shown in a drawing a supply reel pulse output terminal SP and a take up reel pulse output terminal TP of a reel pulse generator 4 for generating a pulse signal according to the rotation of the supply reel and the take up reel are connected via a frequency-to-voltage converter 5 consisting of capacitors $C_1$ to $C_3$, diodes $D_1$ and $D_2$, resistors $R_1$ to $R_3$ and an operational amplifier $OP_1$ and a frequency-to-voltage converter 6 consisting of capacitors $C_4$ to $C_6$, diodes $D_3$ and $D_4$, resistors $R_4$ to $R_6$ and an operational amplifier $OP_2$, respectively to an input terminal A of a reel-stop determining portion 7 consisting of capacitors $C_7$ and $C_8$, resistors $R_7$ to $R_{10}$ and transistors $Q_1$ and $Q_2$. The rewind control signal output terminal REW and the fast-forward control signal output terminal FF of the microprocessor 1 are also connected via a first control signal inversion control portion 8 consisting of a diode $D_5$, resistors $R_{11}$ and $R_{12}$ and a transistor $Q_3$, and a second control signal inversion control portion 9, respectively, to each supply reel motor control terminal SC and take up reel motor control terminal TC. The output terminal B of said reel stop determining portion 7 is commonly connected to the drive control terminals of said control signal inversion control portions 8 and 9, that is, the emitters of transistors $Q_3$ and $Q_4$. In the apparatus as configured in the above described manner, if a high level signal is applied to the take up reel motor control terminal TC and a low level signal is applied to the supply reel motor control terminal SC, then the take-up reel motor is rotated in a forward direction, that is, a direction winding the tape onto the take-up reel to perform the fast-forward operation, while if a low level signal is applied to said take-up reel motor control terminal TC and a high level signal is applied to the supply reel motor control terminal SC, then the supply reel motor is rotated in a backward direction, that is, a direction winding the tape onto the supply reel to perform the rewind operation.

The operation and effects of the present invention as configured in the above described manner will be explained in detail now.

In the fast-forward operation mode, a high level signal is output from the fast-forward control signal output terminal FF of microprocessor 1 while a low level signal is output from the rewind control signal terminal REW thereof, so that the transistor $Q_6$ of the inversion amplifying circuit portion 3 is turned on and the transistor $Q_5$ of the inversion amplifying circuit portion 2 is turned off. Accordingly, a high level signal is provided at the collector of transistor $Q_5$ to the take-up reel motor control terminal TC, and a low level signal is provided at the collector of transistor $Q_6$, so that the take-up reel motor is rotated in a forward direction to thereby perform the fast-forward operation.

In performing the fast-forward operation in this manner, the supply reel and the take-up reel are rotated to output a reel pulse signal at the supply reel pulse output terminal SP and the take up reel pulse output terminal TP of reel pulse generator 4, respectively; and said reel pulse signals are converted to voltages and output at typical frequency-to-voltage converters 5 and 6 and thus, a high level voltage is applied to the input terminal A of reel-stop determining portion 7. Accordingly, the transistors $Q_1$ and $Q_2$ of reel-stop determining portion 7 are turned off, so that a high level signal is output at the output terminal B thereof, and, since this high level signal is applied to control signal inversion control portions 8 and 9, i e., the emitters of transistors $Q_3$ and $Q_4$, said transistors $Q_3$ and $Q_4$ remain off to have no effect on the control signals applied to said take up reel motor control terminal TC and said supply reel motor control terminal SC, thereby continuing to perform said fast-forward operation.

If the fast-forward operation is completed, then the supply reel and take-up reel stop rotating at the moment of completion and thus no reel pulse signals are obtained at the supply reel pulse output terminal SP and take-up reel pulse output terminal TP of reel pulse generator 4. Accordingly, a low level signal is obtained at the output terminal of frequency-to-voltage converters 5 and 6 after the RC time constants of the capacitors $C_2$ and $C_5$ and the resistors $R_2$ and $R_5$ are elapsed, and is applied to the input terminal A of reel stop determining portion 7. Thus, the transistors $Q_1$ and $Q_2$ in the reel stop determining portion 7 is turned on to output a low level signal at the output terminal B thereof. As a result, this low level signal is applied to the drive control stages of control signal inversion control portions 8 and 9, i.e., the emitters of transistors $Q_3$ and $Q_4$. At this time, a high level signal output from the fast-forward control signal output terminal FF of microprocessor 1 is being applied to the base of transistor $Q_4$, so that transistor $Q_4$ is turned on to output a low level signal at the collector thereof and this low level signal is applied to the take-up reel motor control terminal TC. Also, a low signal is applied to the base of the transistor $Q_6$ in the inversion amplifying circuit portion 3 by a low level signal output at the collector of transistor $Q_4$, so that the transistor $Q_6$ is turned off to output a high level signal at the collector thereof, this high level signal being applied to the supply reel motor control terminal SC.

At the time that the supply reel and take up reel are not rotated due to the completion of fast-forward operation, the control signals are inverted to apply a low level signal to said take up reel motor control terminal TC and to apply a high level signal to said supply reel motor control terminal SC. Accordingly, the supply reel motor is momentarily rotated in a forward direction for the braking thereof, and in this time the microprocessor 1 senses the fact that a reel pulse signal has not been output and forces the system to be placed in the stop mode.

In the rewind operation mode a high level signal is applied at the rewind control signal output terminal REW while a low level signal is applied at the fast-forward control signal output terminal FF, so that the transistor $Q_5$ of inversion amplifying circuit portion 2 is turned on while the transistor $Q_6$ of inversion amplifying circuit portion 3 is turned off, to apply a low level signal to the take-up reel motor control terminal TC and to apply a high level signal to the supply reel motor control terminal SC. Accordingly, the supply reel motor is rotated in a forward direction to perform the rewind operation, and thereafter control signals are applied to the supply reel motor control terminal SC and the take up reel motor control terminal TC to at the time that the supply reel and the take-up reel cease to be rotated by the completion of the Rewind operation the braking of the supply reel motor.

As described above, the present invention has an advantage in that control signals applied to control terminals of the supply reel motor and take-up reel motor at the moment of completing the fast-forward or rewind operation are inverted by the hardware to thereby perform the braking of the supply reel and take up reel speedily, so that breakage of the tape or reel can be prevented completely even though a termination detection signal is not available due to a failure of a termination sensor or a poor quality of tape.

What is claimed is:

1. A reel motor braking apparatus for a tape recorder having a take-up reel motor and a supply reel motor, comprising:
    control means for effecting a fast-forward operation and a rewind operation of said tape recorder, including means for applying a high level control signal to said take-up reel motor and a low level control signal to said supply reel motor in said fast-forward operation, and for applying a low level control signal to said take-up reel motor and a high level control signal to said supply motor in said rewind operation;
    pulse generator means for producing pulse signals in response to the rotation of take-up and supply reels during said fast-forward and rewind operations;
    converter means for converting said pulse signals into voltage signals;
    reel-stop determining means, responsive to said voltage signals, for detecting the termination of reel rotation as an absence of said voltage signals and producing a stop signal in response thereto; and
    control signal inversion means, responsive to said stop signal, for inverting the control signals applied to said take-up reel motor and said supply reel motor to effect braking of said take-up and supply reels.

2. The apparatus defined in claim 1, wherein said control means comprises a microprocessor.

3. The apparatus defined in claim 1, wherein said means for applying high and low level control signals comprises at least one transistor inversion amplifier.

* * * * *